United States Patent [19]

Forster

[11] 4,099,333
[45] Jul. 11, 1978

[54] WHEEL ALIGNMENT TESTING APPARATUS

[75] Inventor: Brian Michael Forster, Harthill, England

[73] Assignee: GKN Transmissions Limited, Erdington, England

[21] Appl. No.: 646,754

[22] Filed: Jan. 6, 1976

[30] Foreign Application Priority Data

Jan. 7, 1975 [GB] United Kingdom ............... 537/75
Sep. 20, 1975 [GB] United Kingdom ............ 38698/75

[51] Int. Cl.² .............................................. G01B 5/24
[52] U.S. Cl. ................................................ 33/203.12
[58] Field of Search ........... 33/203.13, 203.15, 203.17, 33/203.16, 203.18, 336, 337, 203.19, 203, 203.12

[56] References Cited

U.S. PATENT DOCUMENTS

| | | | |
|---|---|---|---|
| 2,336,695 | 12/1943 | Maurer | 33/DIG. 6 |
| 2,777,211 | 1/1957 | Martin | 33/203.13 |
| 3,208,154 | 9/1965 | Pancoast | 33/203.13 |
| 3,417,479 | 12/1968 | Hirmann | 33/203.17 |
| 3,793,736 | 2/1974 | Cufrini | 33/203.15 |
| 3,855,709 | 12/1974 | Hirmann | 33/203.15 |
| 3,892,042 | 7/1975 | Senften | 33/203.18 |

*Primary Examiner*—Henry K. Artis
*Assistant Examiner*—John W. Shepperd
*Attorney, Agent, or Firm*—Merriam, Marshall & Bicknell

[57] ABSTRACT

Wheel alignment testing apparatus for vehicles comprises a reference surface plate adapted to be attached to a wheel to be tested and sensing means for sensing the attitude of the reference surface plate. The sensing means includes feelers for contacting the reference surface plate, and a transducer associated with each feeler for providing a signal which represents the position of the feeler, the signals derived from the transducers being analysed by a circuit for giving an indication of the relevant wheel alignment parameters. The apparatus includes driven rollers on which the wheel under test are supported, the test being carried out with the vehicle's wheels rotating. The electric circuit includes means for compensating for any wobble of the reference surface plate if it is not properly aligned with the wheel to which it is attached.

7 Claims, 11 Drawing Figures

WHEEL ALIGNMENT TESTING APPARATUS

BACKGROUND TO THE INVENTION

Field of the Invention

This invention relates to apparatus for testing the alignment of the road wheels of vehicles. As applied to the front wheels of a motor vehicle, the parameters most usually required to be determined are those of toe-in or toe-out of the wheels, but in some cases it is also required to measure the camber angle of the axes about which the wheels swivel.

It is desirable when the alignment of vehicle wheels is to be tested that the required test should be carried out under conditions as close as possible to those pertaining when the vehicle is being driven, i.e. with the weight of the vehicle carried by the wheels and with the wheels rotating. To this end it has been proposed to position the vehicle so that the wheels under test rest on rotatably driven rollers, the required alignment parameters then being measured by suitable transducers which sense the positions of parts of the wheels or tyres.

A problem arises with apparatus of this type in that irregularities in the tyre or wheel rim can give rise to incorrect readings, particularly if the transducers are not correctly positioned relative to the axis of rotation of the wheel. Further, if parts of or associated with the transducers are required to contact the wheel, they must be constructed to withstand abrasion caused by such contact and despite this may be subject to rapid wear. It is also necessary accurately to set up the equipment to suit a particular vehicle having particular wheel dimensions, if consistent and accurate results are to be produced.

SUMMARY OF THE INVENTION

It is an object of the present invention to provide improved wheel alignment apparatus in which these disadvantages are overcome or reduced.

According to the present invention, there is provided apparatus for testing the alignment of road wheels of a vehicle, comprising reference surface means adapted to be secured to a wheel to be tested, and sensing means including feeler means for contacting said reference surface means to sense the attitude thereof, said feeler means being operative upon transducer means for furnishing signals representative of the sensed parameter or parameters to be determined such as toe-in or out and/or camber angle.

This apparatus preferably forms part of apparatus comprising a frame, two pairs of spaced parallel rollers for supporting two wheels of the vehicle to be tested, motor means operative upon said rollers for rotatably driving said wheels, two sensing means for co-operating with reference surface means on said two wheels, and electric circuit means for analysing said signals to furnish data as to the parameter or parameters sensed.

Each sensing means may be provided with feeler means in the form of two horizontally spaced feeler members for detecting toe-in or toe-out, and/or two vertically spaced feeler members for detecting wheel camber, each of such feeler members being associated with an individual transducer which preferably comprises a differential transformer. Each feeler member conveniently takes the form of a rod-like member mounted for linear movement towards and away from the reference surface on the corresponding wheel, and is connected to the core of its associated differential transformer by spring means to accommodate possible over-travel of the feeler member.

Each sensing means is preferably mounted on the frame for adjustment towards and away from the plane of the wheel to be tested, and is provided with means for detecting when the transducer means are approximately in their mid-ranges of operation. This ensures that the transducers operate as far as possible in the region in which their response is substantially linear. Such detecting means may comprise a further feeler member movable relative to the sensing means and associated with switch means for giving a signal when the sensing means is correctly located relative to the reference surface means of the wheel.

The reference surface means may be provided with a marker to indicate the approximate position of the axis of rotation of the wheel to which it is secured, and the sensing means may be provided with a further marker for aligning with the marker on the reference surface means so as to achieve the desired spacing of the feeler members about the axis of rotation of the wheel. The marker means on the sensing means may conveniently be provided by the further feeler member, if present, associated with the switch means.

BRIEF DESCRIPTION OF DRAWINGS

The invention will now be described by way of example with reference to the accompanying drawings of which.

DESCRIPTION OF PREFERRED EMBODIMENT

Figure 1:
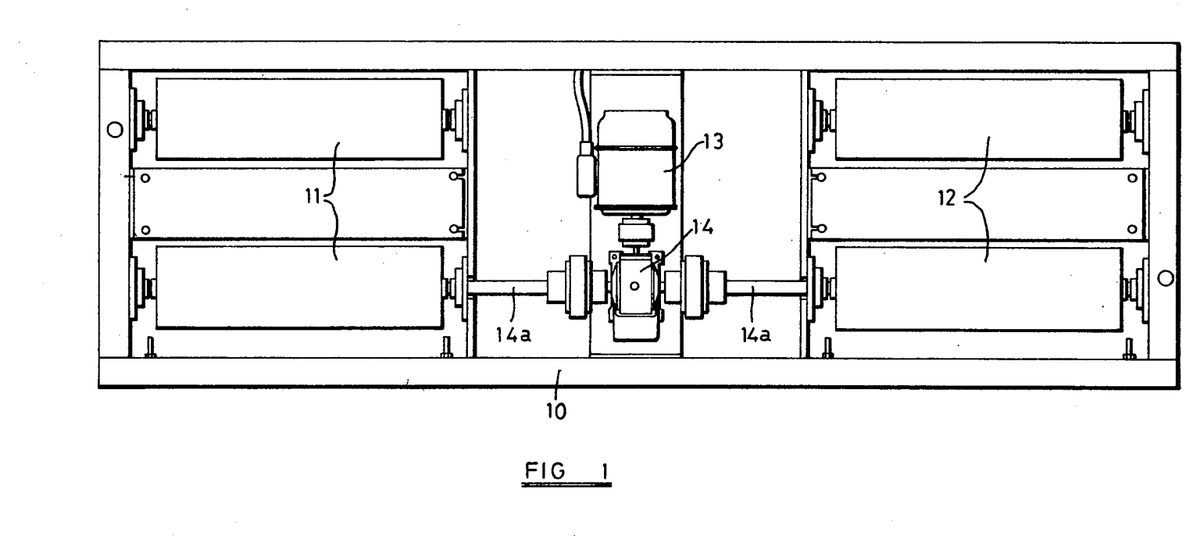
FIG. 1 is a plan view showing the general arrangement of wheel alignment apparatus embodying the invention.

Referring firstly to FIG. 1, wheel alignment apparatus comprises a frame 10 on which are rotatably mounted two pairs of rollers 11, 12, which are horizontal and form cradles for receiving the wheels, normally the front wheels, of the vehicle under test. When carrying out a test, one roller of each pair is driven at a peripheral speed corresponding to approximately 5 kilometers per hour (approximately 100 r.p.m.) by an electric motor 13 through the intermediary of a worm gear box 14 and drive shafts 14a.

Figure 2:
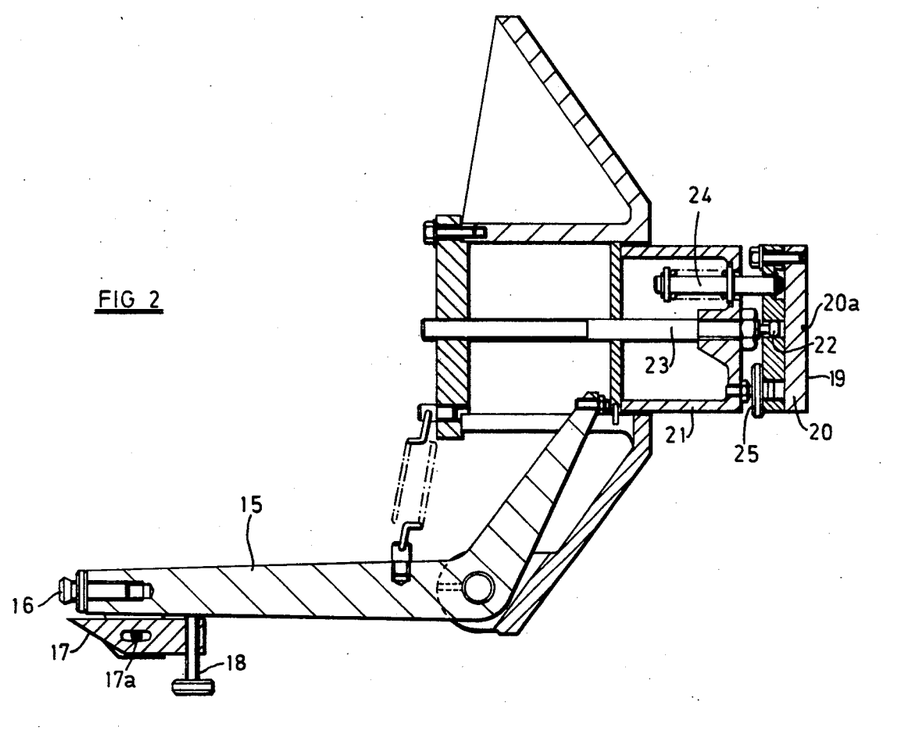
FIG. 2 is a cross-sectional view of a reference surface means of the invention, intended for fitting to a wheel to be tested.

In order to provide a datum or reference surface to permit of determination of the camber (slope of the wheel in the vertical plane) and toe (slope of the wheel in the horizontal plane), reference surface means in the form of a detachable wheel plate assembly as shown in FIG. 2 is provided for each wheel.

The wheel plate assembly comprises three attachment arms, of which one is seen at 15, provided at one end with clamping jaws for attachment to the rim of the wheel. One of the clamping jaws takes the form of a screw with a frustoconical surface at the underside of its head, 16, and the other clamping jaw comprises a finger 17 pivoted at 17a and rockable by a clamping screw 18. This construction of clamping jaws affords a degree of adjustment to enable the attachment arm to be clamped onto wheel rims of different configurations.

The wheel plate assembly includes a reference plate 20 having a reference or datum surface 19. The reference plate 20 is adjustably mounted on a body 21 of the assembly, to which the attachment arms are pivotally mounted, by means of a ball joint 22 provided at the end of a rod 23. Movement of the reference plate about the ball joint 22 is controlled by a spring loaded pull rod 24 and a manually adjustable screw-threaded adjustment rod 25. These components provide for adjustment of the reference plate 20 about a horizontal axis as illustrated in FIG. 2, but further components providing for adjustment about a vertical axis could be provided.

Figure 3:
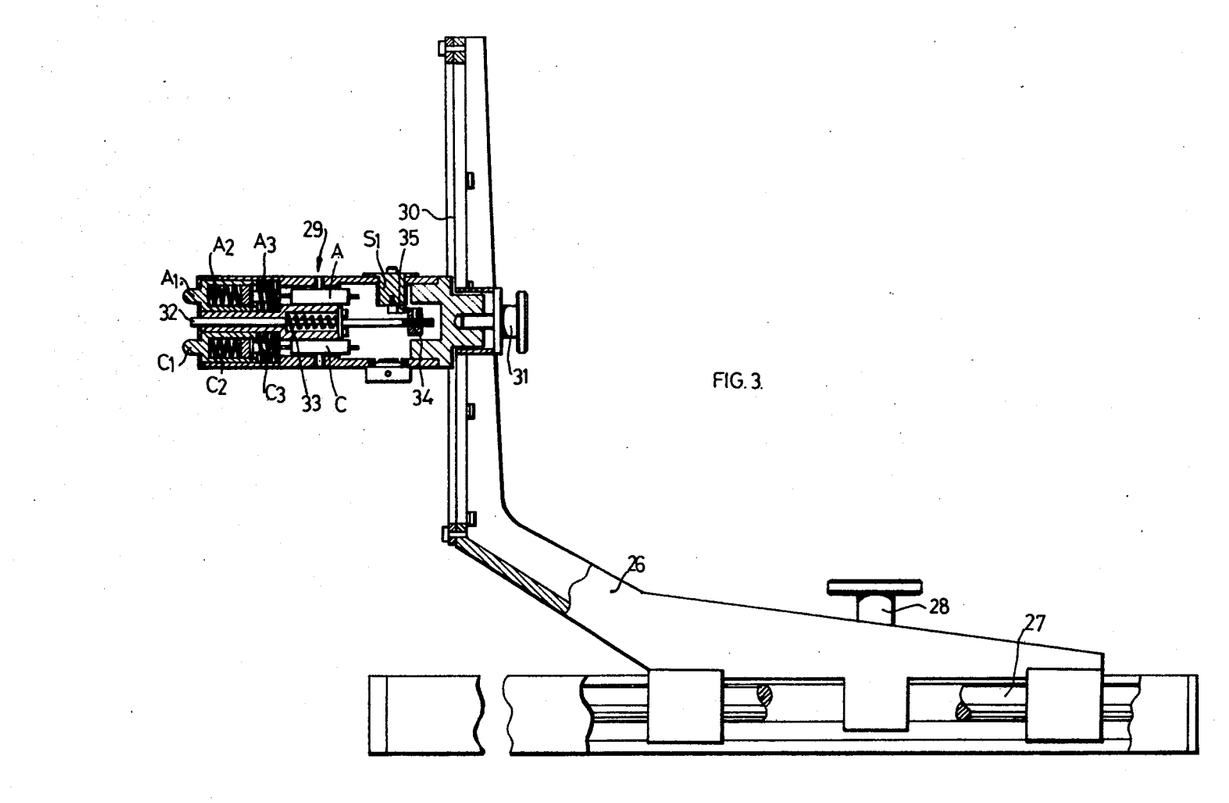
FIG. 3 is a cross-sectional view through a sensing means of the wheel alignment apparatus.

The wheel alignment apparatus further comprises two sensing means in the form of the sub-assemblies as shown in FIG. 3, for sensing the attitude of the wheels supported on the rollers.

Each sensing assembly comprises a mounting arm 26 which is mounted, for linear horizontal movement towards and away from the associated wheel, on two guide rods 27, the arm being securable in an adjusted position by clamping screw 28.

The arm 26 carries a sensing head 29 which is mounted for vertical adjustment on a guide portion 30 of the mounting arm, there being provided a clamping screw 31 for securing the sensing head in its adjusted position.

The sensing head 29 includes four transducers, of which two are spaced apart vertically and are shown as A and C in the drawing. In addition to the transducers A and C there are provided two further identical transducers, B and D, spaced apart horizontally and not shown in FIG. 3.

Each position transducer comprises a differential transformer, and has a slidable core which is connected to an external operating rod. The operating rods of transducers A and C are connected to feeler members in the form of slidable plungers or rods $A_1$ and $C_1$, the connection being through the intermediary of springs $A_2$, $C_2$ respectively. The plungers $A_1$ and $C_1$ are spring biased outwardly of the sensing head 29 by means of springs $A_3$, $C_3$.

The sensing head 29 is also provided with a slidable plunger rod 32 which is spring biased outwardly of the sensing head, i.e. towards the associated wheel, by means of spring 33. The rearmost end of the plunger rod 32 carries a collar 34 for engaging the operating element 35 of a switch $S_1$. The switch $S_1$ is connected in a circuit with a light or equivalent indicator means, not shown.

In use, a vehicle to be tested would be driven so that its wheels are supported by the rollers 11, 12, and wheel plate assemblies as FIG. 2, secured to the wheels to provide reference surfaces. The steering of the vehicle could be locked in the straight-ahead position, but the support of the wheels by the rollers would normally be sufficient to maintain the wheels sufficiently close to the straight-ahead position for accurate measurement to be possible.

The sensing heads 29 are then adjusted vertically on their respective support arms until the ends of their respective plunger rods 32 are aligned with the centres of the reference plates, which may be indicated by marker means 20a, in the form of small depressions in the reference plates.

The clamping screw 28 and the support arm is then released and the sensing assembly moved towards the wheel until the plunger rod 32 is moved sufficiently by contact with the reference plate to cause the indicator light to come on or go out by operation of switch $S_1$. The support arm is then withdrawn slightly until the switch operates again in the opposite sense, and clamped in position. When this condition is achieved, the movable cores of the transducers A and C are in approximately their mid-travel positions, so the transducers are operating as near as possible to their linear ranges.

Figure 10:
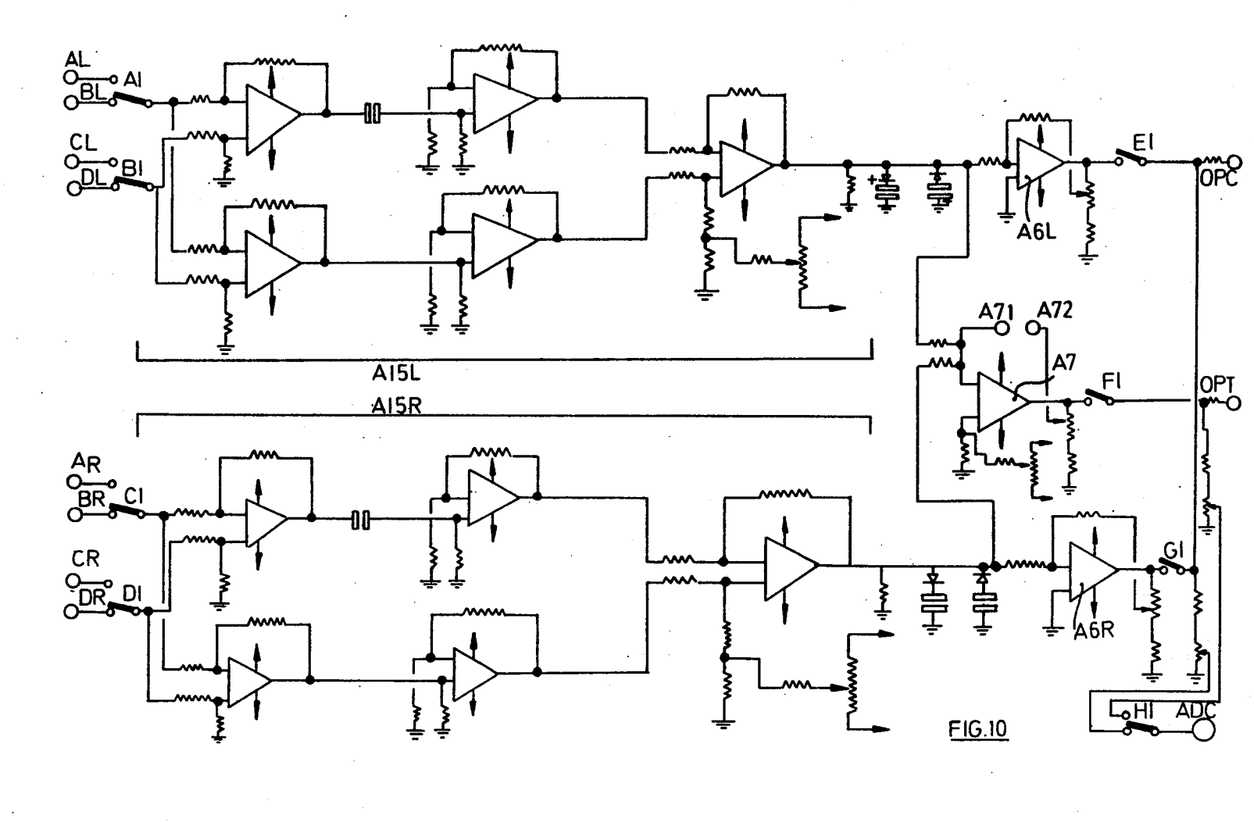
FIG. 10 is a diagram of a circuit for a complete wheel alignment testing apparatus.
Figure 11:
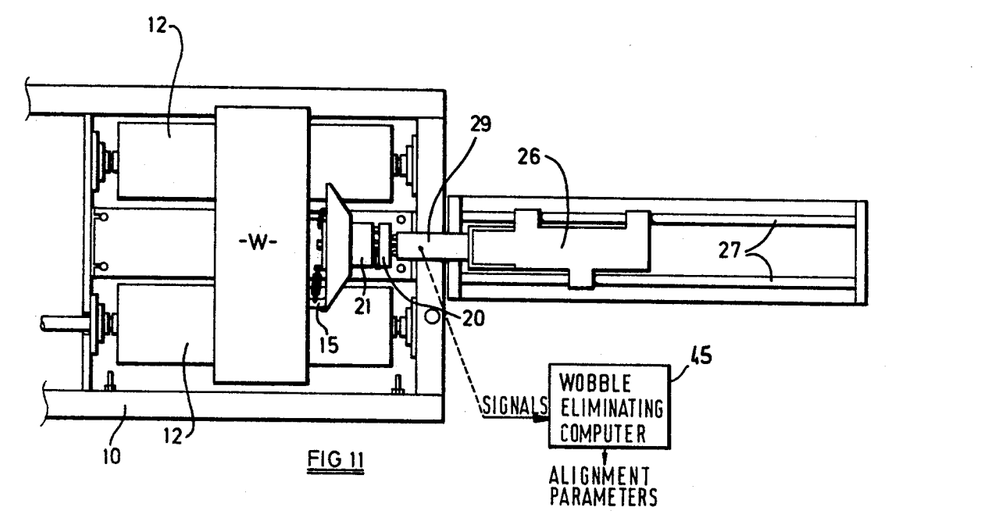
FIG. 11 is a plan view showing a vehicle wheel supported on the apparatus, and the reference surface means and sensing means in operative relation therewith.

In FIG. 11 is diagrammatically shown one wheel W of a vehicle supported on rollers 12, with a wheel plate assembly secured to the wheel. The associated sensing head 29 on its mounting arm 26 has been brought into the position described above, in which its plunger rod 32 is in approximate alignment with the center of reference plate 20. The signals generated by sensing head 29 are supplied to a wobble-eliminating computer 45 incorporating a circuit such as that shown in FIGS. 9 or 10, which eliminates or compensates for any wobble of reference plate 20 and produces an output signal representing a desired wheel alignment parameter.

Figure 4:
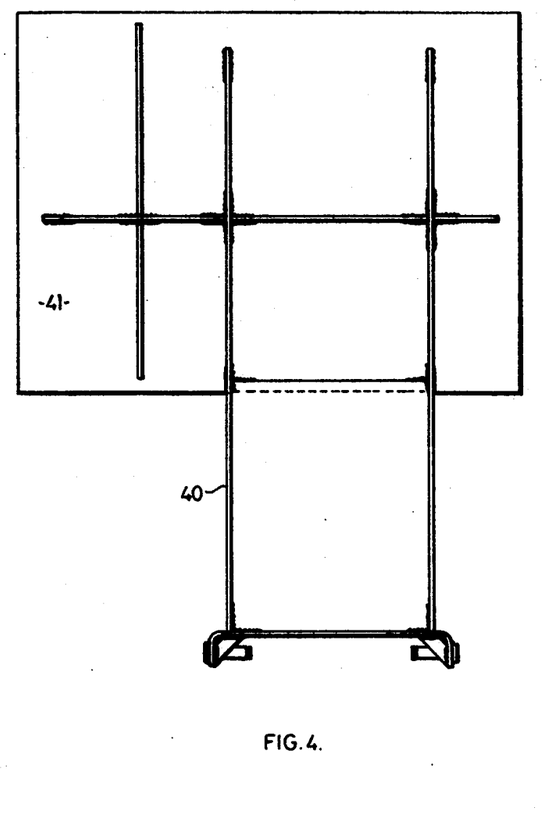
FIG. 4 is an elevation of a vehicle steady for use with the wheel alignment apparatus.

In order to prevent lateral shake of the vehicle whilst under test, which would, if allowed, seriously affect the accuracy of the readings obtained, there is provided a steady or side support unit as shown in FIG. 4. This would be mounted on the frame, and consists of an upstanding bracket 40 carrying a rubber or similar pad 41, the bracket being adjustable so that the pad presses against an appropriate part of the vehicle under test.

For determining camber of the wheel under test, the wheel is rotated and the signal from transducer A subtracted from that of transducer C. If the reference surface 19 of the reference plate 20 is sufficiently accurately aligned with the axis of rotation of the wheel that it rotates in one plane, neither plunger $A_1$ nor plunger $C_1$ would move during rotation of the wheel, but if the reference surface is not accurately aligned at right angles to the axis of rotation of the wheel, both plungers $A_1$ and $C_1$ will move.

The following analysis of the situation which arises if the reference surface is not accurately aligned at right angles to the axis of rotation of the wheel refers to FIGS. 5 to 9 of the drawing. Initially the measurement of wheel camber angle by analysis of the signals from the vertically spaced transducers A and C will be described.

Figure 5:
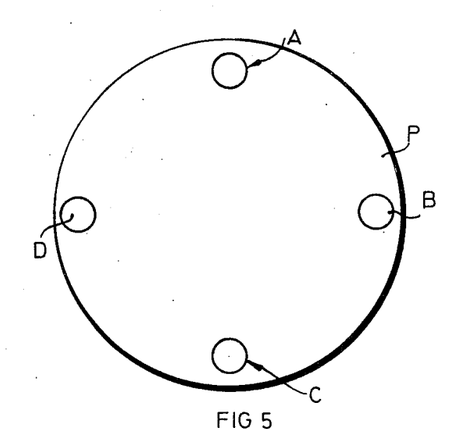
FIG. 5 is a diagrammatic view showing the position of two transducers in relation to a reference surface plate attached to a vehicle wheel, viewed along the axis of rotation of the wheel.
Figure 6:
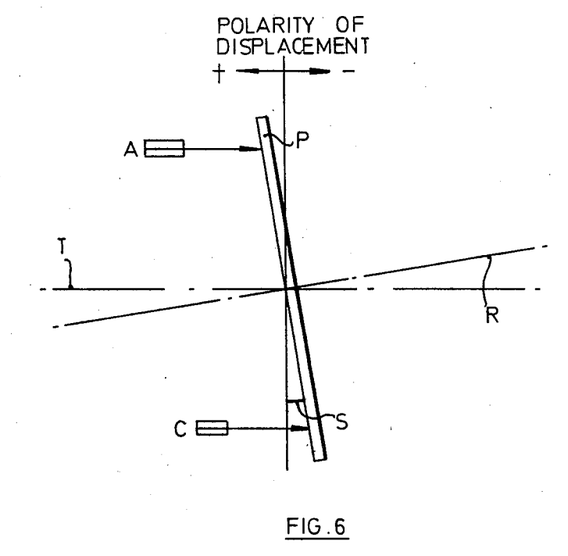
FIG. 6 is a diagrammatic illustration of a reference plate attached to a vehicle wheel, viewed parallel to the surface of the reference plate, FIG. 7 corresponds to FIG. 2, but shows a reference plate which is not fitted at right angles to the axis of rotation of the vehicle wheel.

In FIGS. 5 and 6, the reference surface plate P is secured to a vehicle wheel, not shown, at right angles to the axis of rotation R of the vehicle wheel. The wheel has a camber angle i.e. inclination from the vertical S. The measuring plate P is thus similarly inclined.

Vertically spaced transducers A and C incorporate feeler members for contacting the measuring plate P, the feeler members being displacable parallel to the centre line T of the sensing head which mounts the transducers. The transducers are arranged so that if their associated feeler members contacted a measuring plate in a true vertical plane, the transducers would occupy centre or null positions, and would produce output signals in opposite senses (e.g. positive and negative voltage signals) when contacting a measuring plate oriented in a non-vertical plane.

Figure 7:
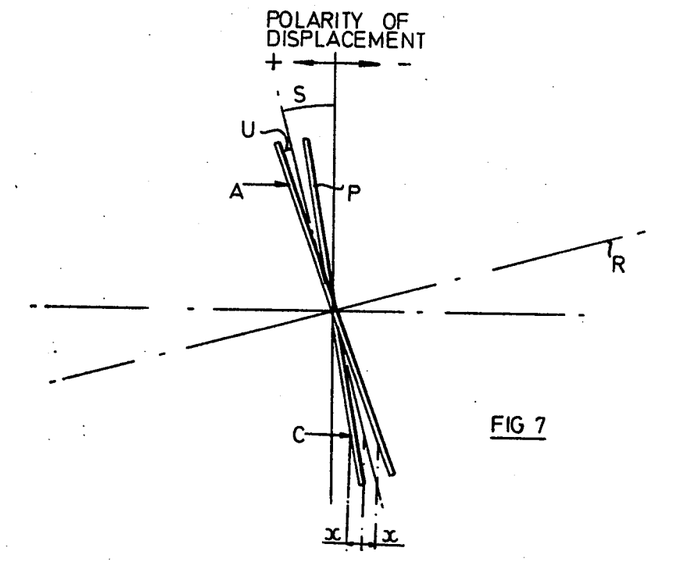

If the measuring plate is accurately aligned at right angles to the axis of rotation of the vehicle wheel, rotation of the wheel will not have any effect on the signals produced by the transducers A and C. If however the measuring plate is inclined to the 90° plane at an angle U, the output signal of the transducer C upon rotation of the wheel will vary since the distance by which its feeler member is displaced from its null position will vary by a distance X on either side of a mean displacement with rotation of the wheel. In FIG. 7 two extreme positions of transducer C are shown, with the wheel rotated through 180° between such positions. The output from transducer A would similarly vary.

The situation can be analysed as follows. If the plane of the measuring plate is at 90° to the axis of rotation of the wheel, the camber angle of the wheel is represented by camber angle = $K(V_A - V_C)$ where $K$ is a gain constant, $V_A$ is the output of transducer A, $V_C$ is the output of transducer C, and movement of a displacement transducer to the left of its centre line produces a positive voltage and to the right of its centre line a negative voltage.

If however the measuring plate is not exactly at right angles to the axis of rotation of the wheel, then as the plate rotates both the transducers A and C will produce output signals varying by an equal amount X each side of the mean displacement as the measuring plate rotates.

Thus at a wheel rotation angle of 0° as shown in FIG. 7, the camber angle will be represented by:

Camber angle = $K[(V_A + x) - (V_C - x)] = K[V_A - V_C + 2x]$ and at 180° the camber angle will be represented by:

Camber angle = $K[(V_A - x) - (V_C + x)] = K[V_A - V_C - 2x]$

Figure 8:
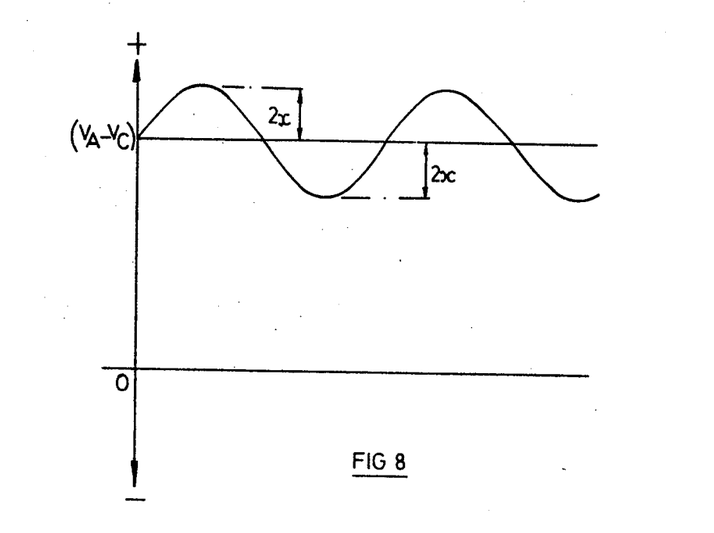
FIG. 8 shows the electrical signals derived from the transducers upon rotation of the wheel.

The camber angle is thus represented by a steady voltage $(V_A - V_C)$ with a sinusoidal voltage of magnitude $\pm 2x$ superimposed as the measuring plater rotates. This is illustrated in FIG. 8.

It is thus required to isolate the sinusoidal voltage component and subtract if from the difference of the transducer outputs to give a steady voltage whose value is $(V_A - V_C)$.

Figure 9:
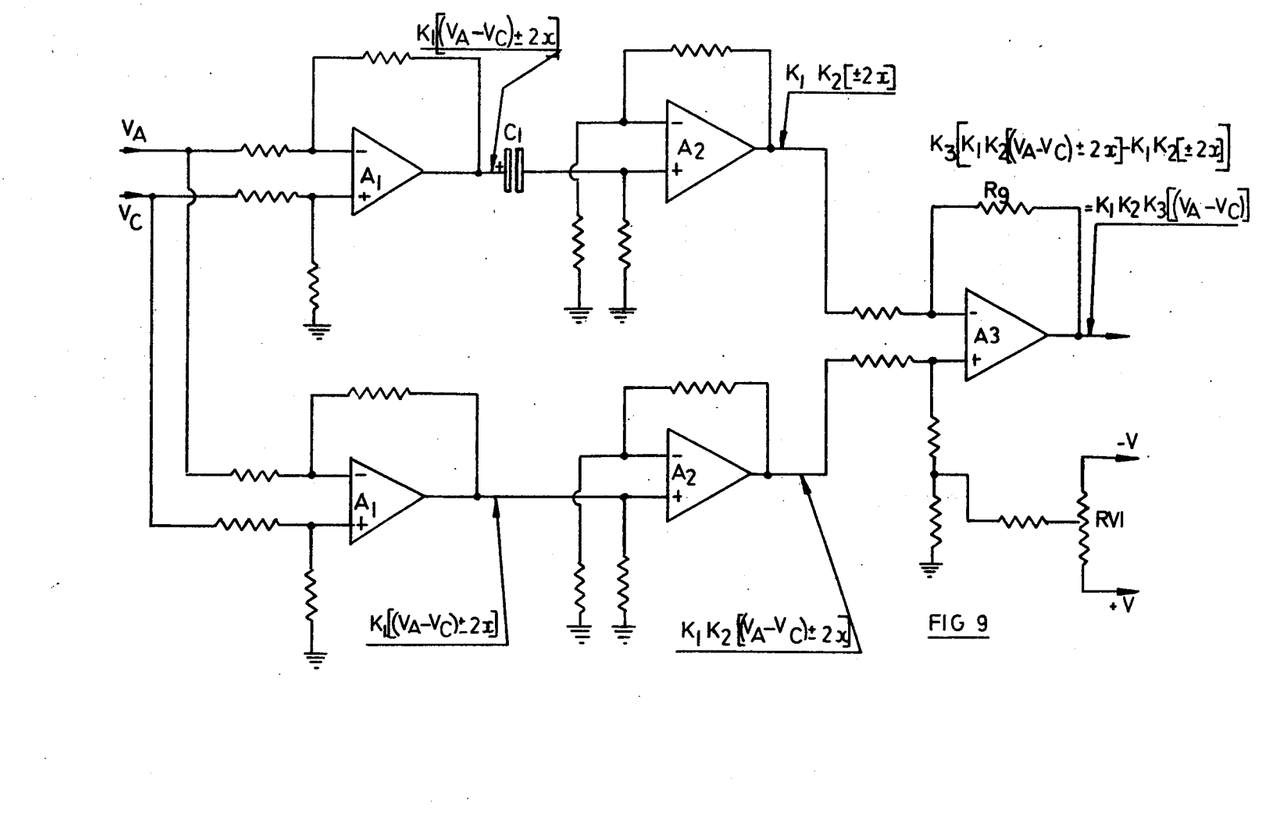
FIG. 9 is a diagram of a circuit for analysing signals from two transducers.

The circuit shown in FIG. 9 includes identical difference amplifiers A1 both of which are supplied with input signals $V_A$ and $V_C$ to give output voltages $K_1[(V_A - V_C) \pm 2x]$, where K1 is a first gain constant. Identical second amplifiers A2 having high input inpedances are supplied with the output voltages of the amplifiers A1, one signal being fed through a capacitor C1 which removes the steady stage component so that at the output of the amplifier the signal is proportional to the sinusoidal voltage only, i.e. the output is $K_1 K_2 [\pm 2x]$ where $K_2$ is the gain constant of the amplifier A2. The output of the other $A_2$ amplifier contains both steady state and sinusoidal components, $K_1, K_2 [(V_A - V_C) \pm 2x]$.

The outputs from the two A2 amplifiers are then passed to a further difference amplifier A3 which subtracts the sinusoidal component from the combined voltage thus giving an output $K_1 K_2 K_3 [(V_A - V_C]$ where $K_3$ is the gain constant of amplifier A3.

The output from amplifier A3 thus represents a steady state component of the difference between the signals from the transducers A and C, and is thus directly representative of wheel camber.

A zero adjustment potentiometer RV1 is provided in association with the amplifier A3.

In FIG. 10 there is diagrammatically illustrated a circuit for enabling the parameters of wheel camber and toe-in or toe-out to be measured for both wheels of a vehicle. The circuit includes inputs $A_L$, $B_L$, $C_L$, $D_L$, connected respectively to transducers A, B, C and D for the left hand wheel, and a further set of inputs $A_R$, $B_R$, $C_R$, $D_R$ for the right hand wheel transducers, these inputs being selectable by switches A1, B1, C1, D1.

The circuit of FIG. 10 includes arrangements of amplifiers, A15L and A15R, each of which is the same as and performs the same functions as the circuit shown in FIG. 9, for left and right hand channels respectively. Further amplifiers A6L and A6R are connected in the circuit respectively to receive the outputs from A15L and A15R, and a further amplifier A7 receives the output from both A15L and A15R.

Amplifier A7 is a summing amplifier of which the gain is variable by the substitution of appropriate feedback resistances between the terminals A71 and A72 thereof. The output from amplifier A7 is by way of switch F1 to a meter OPT giving a direct indication of toe.

The outputs from amplifiers A6L and A6R can be connected by way of switches E1 and G1 respectively to a camber meter OPC. The toe and camber meters OPT, OPC are also connectable selectively by switch H1 to an analogue to digital converter ADC.

The operation of the circuit is as follows.

When left hand wheel camber is to be measured, switches A1 and B1 are operated so that the left hand circuit A15L receives signals from the transducers AL and CL. The camber signal which is the output from A15L is amplified further by amplifier A6L, and the resulting wheel camber signal provided at camber meter OPC. When right hand wheel camber is to be measured, transducer inputs AR, CR would be connected to the circuit A15R, and the output therefrom applied via amplifier A6R and switch G1 to the camber meter OPC.

When toe is to be measured, switches A1, B1, C1, D1 are operated under suitable relay control to revert to their positions shown in FIG. 10 so that A15L receives the signals from the horizontally spaced transducers BL, DL, and A15R receives the signals from transducers BR and DR. The outputs from A15L and A15R are both applied to amplifier A7, which sums them to produce a toe signal which is not dependent on the steering of the vehicle being set to a straight ahead position. The gain constant of amplifier A7 would previously been set to an appropriate value according to the diameters of wheel under test, this calibration typically being performed by a rotary switch marked in units of one inch between ten and seventeen inches (a typical range of vehicle wheel sizes) and connecting appropriate resistances into the circuit.

The output from amplifier A7 is a toe signal which appears at the toe meter OPT. If desired, the toe or camber signals may be applied to the analogue to digital convertor, and to any other desired equipment such as a printer for providing printed readout of the measured wheel alignment parameters.

The wheel alignment apparatus described is intended for measurement of the parameters of toe-in or toe-out, and wheel camber. However, it will be possible also to measure the parameters of castor angle, king-pin inclination, and toe-in or toe-out on turns of the vehicle wheels if the wheel supporting rollers for each wheel are arranged to be capable of swivelling about a vertical axis. The mountings for the sensing heads will swivel about the same axes as the rollers, and in order to take measurements the steering wheel of the vehicle would be rotated through the desired angle and the measurements made by the measuring heads compared with those obtained in the straight ahead position.

I claim:

1. Apparatus for testing the alignment of road wheels of a vehicle comprising:
   (a) a frame;
   (b) two pairs of spaced parallel rollers mounted on said frame for supporting two wheels of a vehicle to be tested;
   (c) motor means for rotating said rollers for effecting rotation of said wheels;
   (d) reference surface means for securement to each wheel to be tested;
   (e) first sensing means for sensing the attitude of said reference means, said first sensing means including a first pair of vertically spaced transducers in operative contact with said reference surface and actuated thereby, each of said transducers continuously producing an electrical signal including a first, DC component representative of at least one wheel alignment parameter and a second, AC component representative of the instantaneous wobble of the reference surface means during rotation of said wheel, and
   (f) electric circuit means connected to and receiving the signals from said pair of transducers, said electric circuit means acting on said signals to separate said second components therefrom and to produce an output signal representing the difference between said first components in the signals from said transducers, said output signal being representative of a wheel alignment parameter.

2. Apparatus as claimed in claim 1 wherein there is provided second sensing means including a second pair of said transducers spaced horizontally from each other.

3. Apparatus as claimed in claim 2 wherein each sensing means comprises:
   (a) feeler members for contacting said reference surface means;
   (b) means mounting said feeler members for movement towards and away from said reference surface means;
   (c) a transducer associated with each feeler member, each such transducer having an input element in accordance with the position of which the transducer gives an output signal, and
   (d) means connecting each feeler member with the input element of its respective transducer, for positioning each input element in accordance with the position of the feeler member.

4. Apparatus as claimed in claim 3 wherein said electric circuit means comprises:
   (a) two subtracting means each for receiving the signals from one transducer from one of said pairs of transducers, and for providing respective outputs representing the difference between said signals;
   (b) means for isolating an AC component, representative of wobble of the reference surface means, from one of said outputs;
   (c) a further subtracting means for subtracting said AC component from the other of said outputs and for providing a resultant signal representative of the difference between DC components, representative of a wheel alignment parameter, of the output signals of the transducers of the pair.

5. Apparatus for testing the alignment of road wheels of a vehicle comprising:
   (a) a frame;
   (b) two pairs of spaced parallel rollers mounted on said frame for supporting two wheels of a vehicle to be tested;
   (c) motor means for rotating said rollers for effecting rotation of said wheels;
   (d) reference surface means for securement to each wheel to be tested;
   (e) sensing means for sensing the attitude of said reference means, said sensing means including a pair of horizontally spaced transducers in operative contact with said reference surface and actuated thereby, each of said transducers continuously producing an electrical signal including a first, DC component representative of at least one wheel alignment parameter and a second, AC component representative of the instantaneous wobble of the reference surface means during rotation of said wheel, and
   (f) electric circuit means connected to and receiving the signals from said transducers, said electric circuit means acting on said signals to separate said second components therefrom and to produce an output signal representing the difference between said first components in the signals from said transducers, said output signal being representative of a wheel alignment parameter.

6. Apparatus as claimed in claim 5 wherein said sensing means comprises:
   (a) feeler members for contacting said reference surface means;
   (b) means mounting said feeler members for movement towards and away from said reference surface means;
   (c) a transducer associated with each feeler member, each such transducer having an input element in accordance with the position of which the transducer gives an output signal, and
   (d) means connecting each feeler member with the input element of its respective transducer, for positioning each input element in accordance with the position of the feeler member.

7. Apparatus as claimed in claim 6 wherein said electric circuit means comprises:
   (a) two subtracting means each for receiving the signals from one transducer from one of said pairs of transducers, and for providing respective outputs representing the difference between said signals;

(b) means for isolating an AC component, representative of wobble of the reference surface means, from one of said outputs;

(c) a further subtracting means for subtracting said AC component from the other of said outputs and for providing a resultant signal representative of the difference between DC components, representative of a wheel alignment parameter, of the output signals of the transducers of the pair.

* * * * *